July 25, 1967 E. E. TUTTLE 3,332,774
METHOD OF MAKING A SINTERED IMPREGNATED METAL BRAKE DRUM
Filed Dec. 18, 1963 3 Sheets-Sheet 1

INVENTOR.
ELVIN E. TUTTLE
BY
Barnes, Kisselle, Raisch & Choate
ATTORNEYS

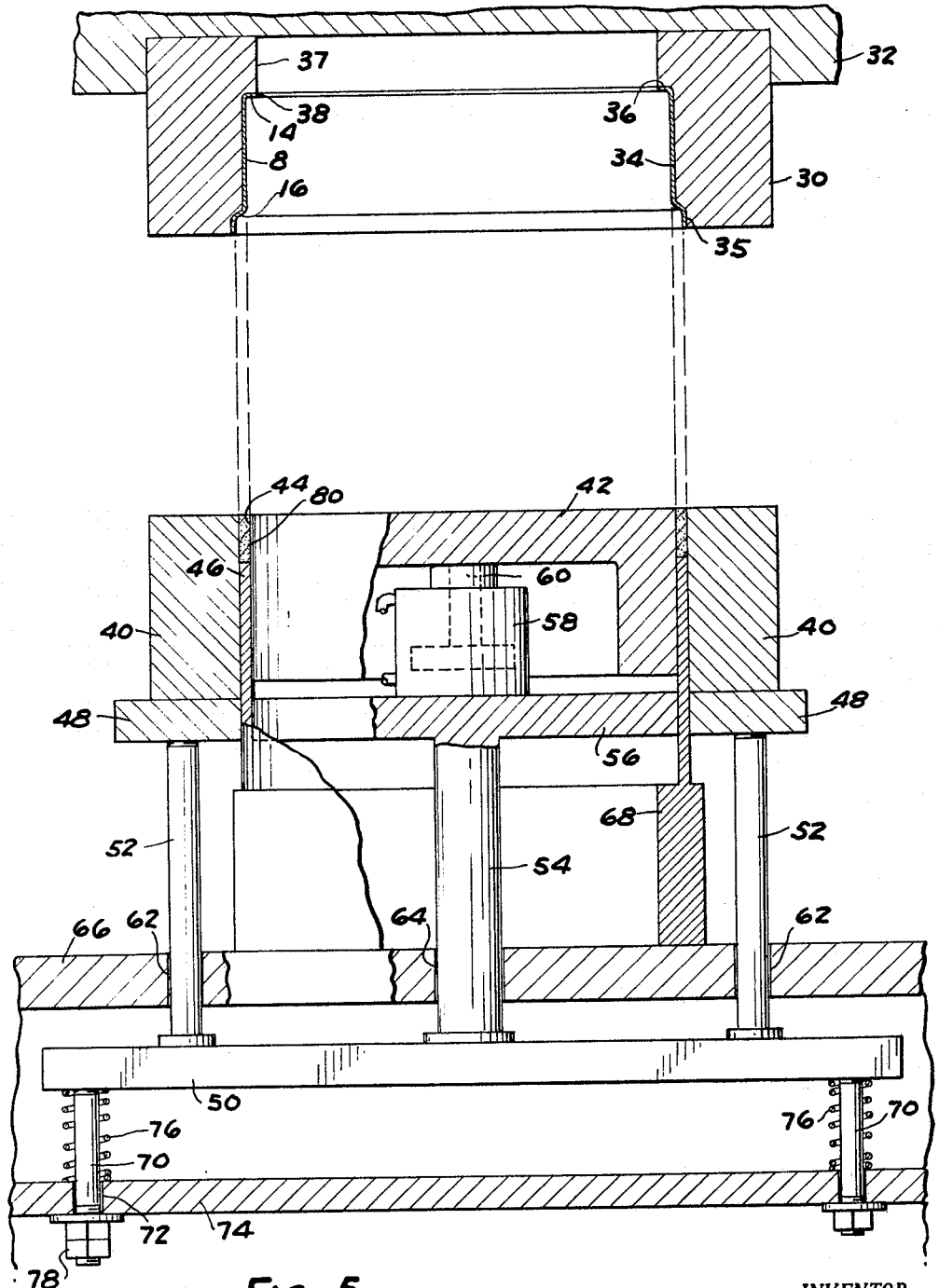

July 25, 1967 E. E. TUTTLE 3,332,774
METHOD OF MAKING A SINTERED IMPREGNATED METAL BRAKE DRUM
Filed Dec. 18, 1963 3 Sheets-Sheet 3

INVENTOR.
ELVIN E. TUTTLE
BY
Barnes, Kisselle, Raisch & Choate
ATTORNEYS

United States Patent Office

3,332,774
Patented July 25, 1967

3,332,774
METHOD OF MAKING A SINTERED IMPREGNATED METAL BRAKE DRUM
Elvin E. Tuttle, Lansing, Mich., assignor, by mesne assignments, to Motor Wheel Corporation, Akron, Ohio, a corporation of Ohio
Filed Dec. 18, 1963, Ser. No. 331,532
6 Claims. (Cl. 75—200)

This invention relates to brake drums of the type having an outwardly flared portion adjacent an open end of the shell to form a dust seal in the finished drum and in particular to a method and apparatus for lining such a shell with a sintered metal brake track infiltrated with copper.

This invention contemplates fabricating brake drums of the aforementioned type by a method and apparatus that are economical and efficient; that minimize fractures in an iron powder compact which when sintered forms the brake track; that assure intimate contact between the iron powder and an infiltrant during the sintering operation; and that eliminate undesirable erosion of the iron powder by the infiltrant.

In the drawings:

FIG. 5 shows an open press having dies arranged to compact infiltrant powder within the outwardly flared portion of the shell.

Figure 1:
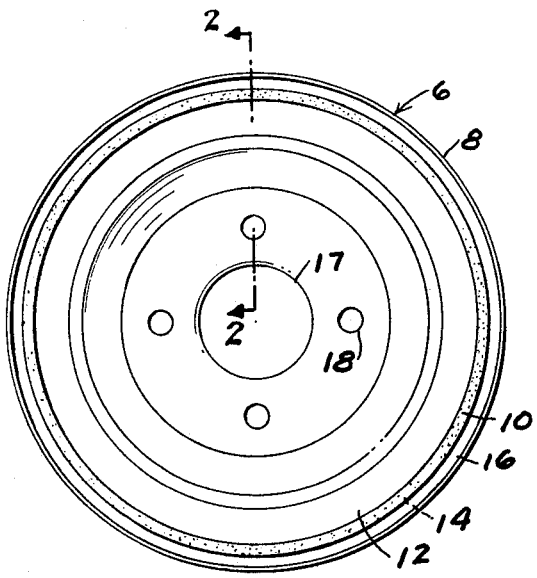
FIG. 1 shows a brake drum, looking into the cavity thereof, the brake drum having a sintered metal brake track.
Figure 2:
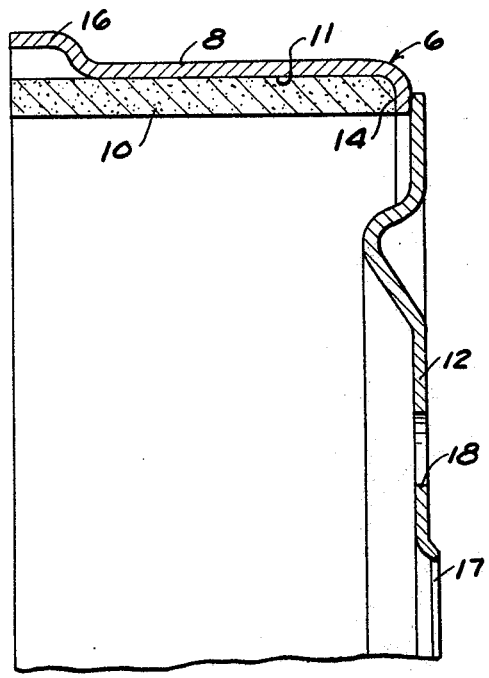
FIG. 2 is an enlarged fragmentary section taken through line 2—2 of FIG. 1.

FIGS. 1 and 2 show a finished brake drum 6 comprising a generally cylindrical steel shell 8, a brake track 10 that lines the inner cylindrical surface 11 of shell 8, and a drum back 12 which is welded to a radially inward extending flange 14 on shell 8. Shell 8 also has an outwardly flared portion 16 that forms a dust seal when drum 6 is assembled with other brake parts. Back 12 is provided with a central aperture 17 and bolt holes 18 for assembling drum 6 on other wheel parts. Brake track 10 is sintered metal powder, primarily finely divided iron particles with carbon and possibly other alloying elements. A substantial quantity of copper fills the voids or interstices between the finely divided iron particles to improve the physical properties of drum 6. The copper extends throughout the iron particles, from the inner peripheral surface to the outer peripheral surface of brake track 10 and brazes track 10 to shell 8.

Figure 3:
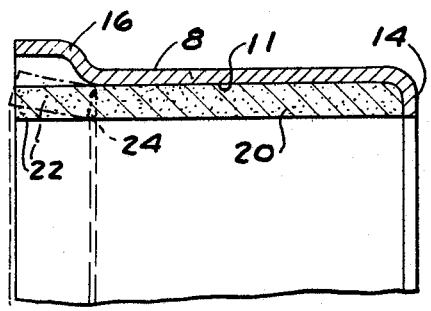
FIG. 3 is a fragmentary sectional view showing a sleeve of compacted iron powder positioned in a brake drum shell and illustrating a type of fracture that may occur prior to the sintering operation.

Brake drums of the type illustrated in FIGS. 1 and 2 have been fabricated by compacting a green compact sleeve 20 (FIG. 3) of iron powder directly within shell 8, or alternatively by compacting the sleeve and then inserting it within shell 8. In either situation sleeve 20 has an end portion 22 that is unsupported adjacent the outwardly flared portion 16 of shell 8. End portion 22 may crumble or crack circumferentially as indicated at 24 and illustrated in broken lines (FIG. 3). This type of fracture can occur while the sleeve is being compacted or inserted within the shell or during subsequent handling, as for example, while the infiltrant, such as a coil of copper wire, is positioned within the sleeve.

In accordance with the instant invention an annular ring 26 (FIG. 4) of infiltrant is positioned within the outwardly flared portion 16 of shell 8 to support end 22. Preferably infiltrant ring 26 is positioned within portion 16 and then sleeve 20 is compacted directly within shell 8. This simplifies the construction of the compacting dies and also provides support for end 22 while the dies are being withdrawn and during subsequent handling until the infiltrant melts during the sintering operation. Similarly, if sleeve 20 is compacted in separate dies and then inserted in shell 8, ring 26 supports end 22 during subsequent handling. Ring 26 may be machined from copper stock and assembled within portion 16 prior to the compacting operation. Alternatively, ring 26 may be infiltrant powder compacted within portion 16 prior to compacting the sleeve 20.

Figure 4:
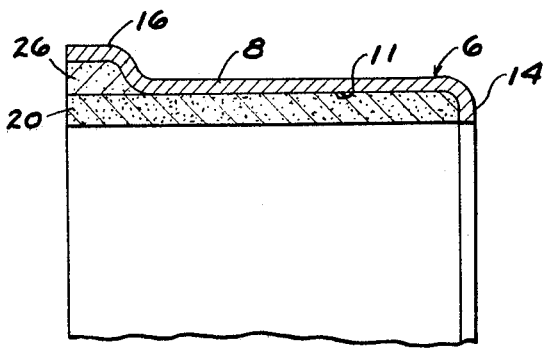
FIG. 4 shows an embodiment of the instant invention where a ring of infiltrant has been compacted or otherwise positioned in the outwardly flared portion of the shell prior to compacting or inserting the sleeve of iron powder in the shell.

FIG. 5 is a fragmentary vertical section illustrating the dies and die actuators of a press such as might be used in compacting ring 26 within portion 16 (FIG. 4). An upper female die 30 is mounted on a die shoe 32 which is carried on the ram (not shown) of the press. Die 30 has a generally cylindrical cavity 34, a counterbore 35 and an annular shoulder 36 between cavity 34 and a bore 37 that extends through die 30. Cavity 34, counterbore 35 and shoulder 36 conform closely to the contour of shell 8 to retain shell 8 in die 30 and restrain distortion of shell 8 during the compacting operation. Bore 37 has a diameter equal to the diameter of a circular aperture bounded by an inner edge 38 of flange 14. A set of lower dies includes an annular confining die 40 and a core die 42 concentrically spaced radially inward of die 40 to form an annular receptacle 44 therebetween. Receptacle 44 is closed at its lower end by an annular compacting die 46. Receptacle 44 and die 46 are vertically aligned with portion 16 of shell 8 and have thicknesses substantially equal to the radial thickness of ring 26 (FIG. 4). Die 42 has a diameter just slightly less than the inner diameter of shell 8 so as to be slidable in shell 8.

Die 40 is mounted on a vertically movable platen 48 which, in turn, is supported on a vertically movable platen 50 by a plurality of vertical rods 52. Platen 50 also supports die 42 through a vertical post 54, a movable platen 56 and a power cylinder 58 having a fluid-actuated piston 60 for moving die 42 upward relative to platen 50 and die 40. Rods 52 and post 54 are vertically movable through suitably dimensioned apertures 62, 64, respectively, in a stationary platen 66. Die 46 is mounted on platen 66 by an annular base 68. Platen 50 is arranged to float with respect to platen 66 and die 46. To this end a plurality of vertical rods 70 are secured in platen 50 and extend downward through openings 72 in a lower stationary platen 74. Compression springs 76 surrounding respective rods 70 engage the lower surface of platen 50 and the upper surface of platen 74 to urge platen 50 upward. Nuts 78 are threaded on the lower end of rods 70 to engage platen 74 and limit upward travel of platen 50. By this arrangement platen 50 can be moved downward toward platen 74 against the action of springs 76 so that dies 40, 42 move downward relative to die 46 which is stationary.

Figure 7:
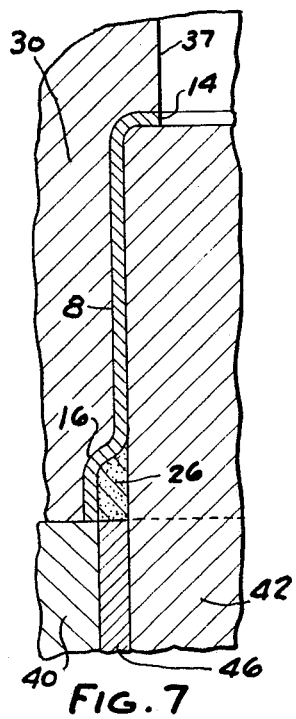
FIG. 7 shows the dies of the press shown in FIGS. 5 and 6 as they appear after the infiltrant has been compacted.
Figure 6:
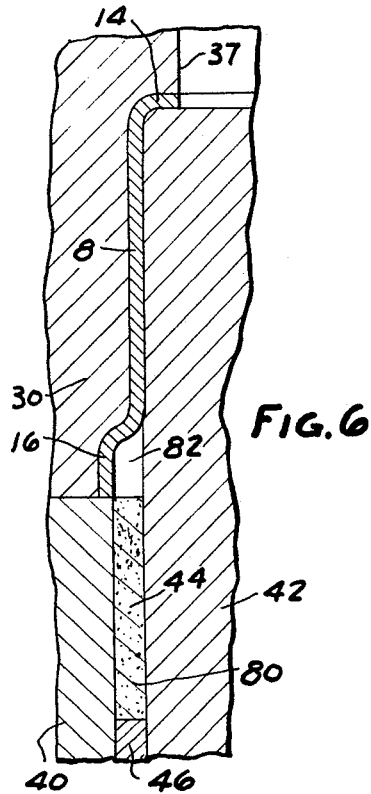
FIG. 6 is an enlarged fragmentary view showing the dies of the press just before the infiltrant is compacted within the shell.

With the upper and lower dies spaced apart as shown in FIG. 5, shell 8 may be inserted into die 30 and retained therein by friction or suitable holders (not shown). Receptacle 44 is then charged with a quantity of copper powder 80 sufficient to fill the outwardly flared portion 16 of shell 8 and form ring 26 (FIG. 4). The compacting operation is initiated by lowering the ram (not shown) which carries die 30 downward until it bottoms on die 40. Die 42 is then moved upward by piston 60 past portion 16 and into engagement with flange 14. FIG. 6 shows the position of the dies after die 30 has bottomed on confining die 40 and die 42 has bottomed on flange 14. As shown in FIG. 6 the space between die 42 and the portion 16 forms an annular mold 82 for ring 26. As the ram continues downward, die 30 pushes dies 40, 42 downward relative to die 46 which is stationary so that copper powder 80 is compacted within mold 82 to form ring 26 in tight assembly with portion 16 of shell 8 (FIG. 7). The press is then opened and shell 8 having infiltrant ring 26 therein is removed from die 30 and placed in another press to have sleeve 20 compacted within shell 8.

Figure 8:
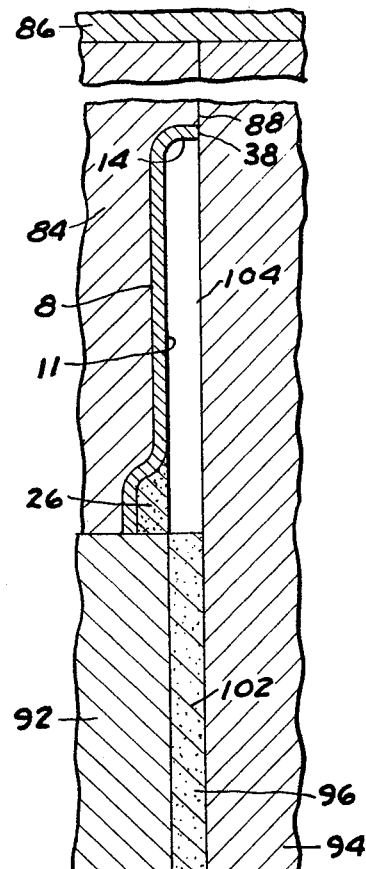
FIG. 8 shows the dies of a press similar to that shown in FIG. 5 which are used to compact a sleeve of iron powder within the shell after the infiltrant has been compacted within the outwardly flared portion of the shell.

Generally, the die arrangement for compacting sleeve 20 of iron powder corresponds to the die arrangement for compacting infiltrant ring 26. FIG. 8 is a fragmentary vertical section illustrating the dies as they appear just prior to compacting the iron powder. An upper female die 84 is mounted on a die shoe 86 which is carried on the ram (not shown) of the press. Die 84 is identical to die 30 (FIGS. 5–7) including a bore 88 corresponding to bore 37 in die 30. Bore 88 has a diameter equal to the diameter of the circular aperture bounded by the radially inner edge 38 of flange 14. A set of lower dies includes an annular confining die 92 and a core die 94 concentrically spaced radially inward of confining die 92 to form an annular receptacle 96 therebetween. Receptacle 96 is closed at its lower end by an annular compacting die 98. Receptacle 96 and die 98 have radial thicknesses corresponding to the radial thickness of sleeve 20. The diameter of die 94 is just slightly less than the diameter of bore 88 so that die 94 can move within bore 88 into engagement with shoe 86. The inner cylindrical surface 100 of die 92 is vertically aligned to register with the inner cylindrical surface 11 of shell 8. Receptacle 96 may be approximately two and one-half times the height of shell 8 to accommodate a quantity of loose iron powder 102 sufficient to form sleeve 20 (FIG. 4) to a height equal to the height of shell 8. The actuators for dies 84, 92, 94 and 98 are substantially identical to those shown in FIG. 5 except that movable platen 50 must travel approxiamtely two and one-half times the height of shell 8.

Figure 9:
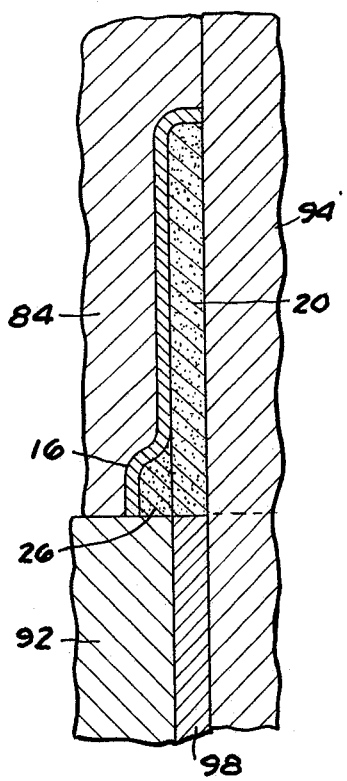
FIG. 9 shows the dies of the press illustrated in FIG. 8 after the sleeve of iron powder has been compacted within the shell.

During the compacting operation die 84 is lowered until it bottoms on die 92. Die 94 is then moved upward through bore 88 into engagement with shoe 86. FIG. 8 shows the position of the dies after die 84 has bottomed on die 92 and die 94 has bottomed on shoe 86. The space between die 94 and the inner cylindrical surface 11 of shell 8 together with ring 26 forms an annular mold 104. As the ram continues downward, die 84 and shoe 86 push dies 92 and 94 downward relative to compacting die 98 which is stationary so that iron powder 102 is compacted within mold 104 to form sleeve 20 in tight assembly with shell 8 and ring 26 (FIG. 9). Suitable stops are provided on the press to terminate the downward movement of the ram when die 98 has formed sleeve 20 to the proper height. After sleeve 20 is compacted, die 84 is raised so that shell 8 having sleeve 20 therein may be removed from die 84.

The operations as described in conjunction with FIGS. 5–9 produce the assembly illustrated in FIG. 4. Shell 8, ring 26, and sleevve 20 are then heated to a temperature of approximately 2000° to sinter sleeve 20 and melt the copper in ring 26. The melted copper infiltrates the iron structure of sleeve 20 and contacts shell 8 to braze sleeve 20 to shell 8.

When the sleeve is infiltrated as hereinbefore described by positioning infiltrant within the outwardly flared portion of the shell, the infiltrant will support the end portion of the sleeve until the infiltrant melts during the sintering operation. Intimate contact between the infiltrant and the iron powder is assured particularly where the iron powder is compacted in direct contact with the infiltrant. By positioning the infiltrant adjacent the outer peripheral surface of the sleeve any erosion of the iron powder by the infiltrant during the sintering operation does not affect the braking surface of the brake track material. Therefore, little, if any, machining of the brake track is necessary.

I claim:
1. In the method of lining a brake drum shell that is open at one end thereof and has a radially outwardly flared portion at said one end adapted to form a dust seal groove when said shell is assembled with other brake parts, the steps of positioning infiltrant within said flared portion, positioning a sleeve of primarily ferrous powder within said shell with an end portion of said sleeve disposed adjacent said infiltrant so as to be supported radially thereby, said infiltrant having a melting temperature in the sintering temperature range of said ferrous powder, and heating said sleeve and said infiltrant to a temperature within the sintering temperature range of said ferrous powder.

2. The method set forth in claim 1 wherein said sleeve is compacted within said shell after said infiltrant has been positioned in said flared portion.

3. The method set forth in claim 1 wherein said infiltrant comprises infiltrant powder compacted in said flared portion.

4. The method set forth in claim 1 wherein said infiltrant comprises copper powder compacted in said flared portion.

5. The method set forth in claim 1 wherein said infiltrant comprises a ring of metal stock inserted in said flared portion.

6. The method set forth in claim 5 wherein said metal ring is copper.

No references cited.

CARL D. QUARFORTH, *Primary Examiner.*

JOHN F. CAMPBELL, *Examiner.*

P. M. COHEN, R. L. GRUDZIECKI,
*Assistant Examiners.*